United States Patent [19]

Becker et al.

[11] 4,064,226
[45] Dec. 20, 1977

[54] METHOD FOR THE GENERATION OF HYDROGEN

[75] Inventors: Franz Becker; Philipp Jäger, both of Erlangen, Germany

[73] Assignee: Siemens Aktiengesellschaft, Berlin and Munich, Germany

[21] Appl. No.: 683,691

[22] Filed: May 6, 1976

[30] Foreign Application Priority Data

May 12, 1975 Germany .............................. 2521090

[51] Int. Cl.² .............................................. C01B 1/07
[52] U.S. Cl. .................................. 423/657; 423/648 R; 23/282
[58] Field of Search ....................... 423/657, 658, 648; 23/282, 252 R; 214/17 C

[56] References Cited

U.S. PATENT DOCUMENTS

| 2,416,717 | 3/1947 | Shaw | 23/252 R X |
| 3,932,600 | 1/1976 | Gutbier et al. | 423/657 |
| 3,985,865 | 10/1976 | Hohne | 423/657 |

Primary Examiner—Edward J. Meros
Attorney, Agent, or Firm—Kenyon & Kenyon, Reilly, Carr & Chapin

[57] ABSTRACT

A method and apparatus for generating gaseous hydrogen by the reaction of a metal and an aqueous salt solution is provided wherein the method comprises:

a. forming a powder from a pressed blank of the metal; and b. introducing said powder as it is formed into an aqueous salt solution.

7 Claims, 1 Drawing Figure

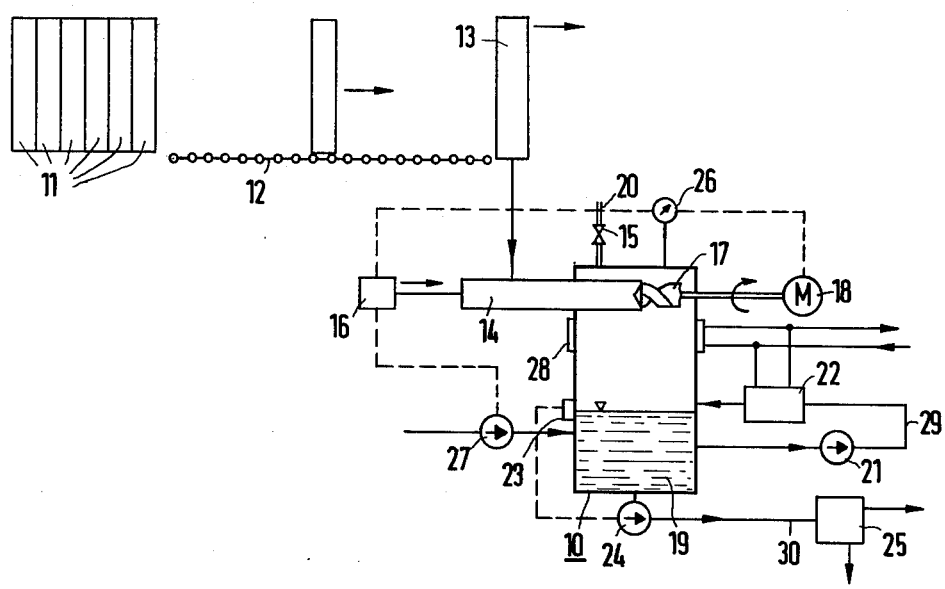

METHOD FOR THE GENERATION OF HYDROGEN

BACKGROUND OF THE INVENTION

The invention is concerned with a method for generating hydrogen, particularly hydrogen for fuel cells, by the reaction of metals with an aqueous salt solution.

It is known in the art to react metals with aqueous salt solutions for the purpose of generating hydrogen (see German Pat. No. 591,753, page 1, line 58, to page 2, line 20). For this purpose, water is decomposed by alkaline earth metals such as calcium, strontium and barium in the presence of a water-soluble salt, advantageously a halide of those metals.

For the generation of hydrogen for fuel cells, in which current is generated by an electrochemical reaction between hydrogen as the fuel and oxygen or air as the oxidant German Offenlegungsschrift No. 2,244,944 describes a method for the production of hydrogen by reacting magnesium or a mixture of magnesium and aluminum with water in the presence of at least one cobalt oxide and at least one water-soluble chloride. As the cobalt oxide, tricobalt tetroxide, $Co_3O_4$, is preferably employed. This method permits the production of hydrogen in a simple manner and in high yield. It is further known to add molybdenum compounds to the reaction mixture in this process, particularly molybdenum oxides or molybdates (see German Offenlegungsschrift No. 24 21 538). Through the addition of such molybdenum compounds, the yield of developed hydrogen can be further increased.

In the above described methods, the metal or the metal mixture is generally used in powder form to accelerate the reaction. For the generation of hydrogen, the metal can be provided in powder form and the reaction solution added to the powder. In general, however, the metal powder is added to a vessel containing the reaction solution by means of a screw conveyor, for example.

If the metals are used in powder form, however a number of difficulties are encountered which concern the storage of the raw materials in powder form, its transportation to the reaction vessel and its introduction into the reaction vessel, the dosaging and the removal of the reaction sludge. Materials in powder form require a relatively large storage space and the removal of air, which is advantageously accomplished before the powder is added to the reaction solution, takes a fairly long time. In addition, adding the metal powder to a reaction vessel can be a problem because the water vapor (steam) present in the vessel during the reaction may cause the powder to coalesce at the point of entry, which leads to clogging of the feed.

SUMMARY OF THE INVENTION

It is the object of the present invention to provide a process and apparatus therefor which avoids the disadvantages of the prior art methods described above. In particular, a method for the generation of hydrogen by metal hydrolysis by means of aqueous salt solutions is provided by the present invention which ensures availability of the hydrogen without problems in operation over extended periods of time and with changing hydrogen demand or consuption.

The method for generating hydrogen by the reaction of a metal with an aqueous salt solution according to this invention comprises; (a) forming a powder from a pressed blank of the metal; and (b) introducing said powder as it is formed into the aqueous salt solution.

By using the metals and metal mixtures in the form of pressed blanks, from which a powder is formed and removed from the blanks mechanically, the advantages which are obtained if materials in powder form were used, i.e., high reaction speeds and high yield, are combined with the advantages which are obtained through the use of and in the handling of compact materials. Thus, pressed blanks require less space for storage, they are easier to transport than materials in powder form, and degassing is easier to accomplish and takes less time. In addition, there are no problems with adding the metal to the reaction solution, since the powder is mechanically removed from the pressed blanks. In this manner, coalescence of the powder and clogging of the feed to the reaction vessel are avoided. The present method provides for the generation of hydrogen without problems in operation over extended periods of time and with changing hydrogen demand.

DESCRIPTION OF THE PREFERRED EMBODIMENTS

With the method according to the invention, all suitable metals can be used such as the alkaline earth metals calcium and barium. Preferably, magnesium and magnesium/aluminum mixtures are used. In such case, a sodium chloride solution is preferably used as the aqueous salt solution, for example, in the form of sea water. A cobalt oxide, particularly $Co_3O_4$, may also be admixed to the metal. A molybdenum compound may advantageously also be added, which is preferably admixed with the salt solution.

The pressed blanks can be made from the metal in powder form by pressing (molding pressure about 100 $N/mm^2$). A material of high density is obtained which is very inert to reactions as compared to the powder, so that no special precautions need to be taken for its storage. By providing the blanks in a suitable shape such as a hexagonal polyhedron, the blanks will have hardly any "dead space" when stored. In this manner, the storage space can be kept to a minimum. The pressed blanks themselves can be made in any size. As laboratory samples, cylinders 10 cm high and with a diameter of 3 cm, for example, will serve. However, larger pressed blanks can also be used having a height of up to about 1 meter.

According to this invention, the generation of hydrogen is preferably controlled by the pressure in the reaction vessel. In this connection, the feeding of the pressed blanks and/or the rate of their being ground down into powder form can be controlled by the pressure of the hydrogen generated by the process. The control is accomplished in such a manner that with increasing pressure, the feeding or the powdering rate is slowed down and vice-versa. The feeding may be mechanical or hydraulic.

The apparatus for generating hydrogen by reaction of a metal with an aqueous salt solution according to this invention comprises; (a) a reaction vessel; (b) means for feeding a pressed metal blank to said vessel in the upper part thereof; and (c) means for mechanically removing metal powder from said blank.

A lock is preferably provided for feeding the pressed blanks to the reaction vessel. This lock can be evacuated, so that contamination of the hydrogen developed in the reaction vessel with air is prevented. The metal can be placed in the reaction vessel and replenished via a lock more simply if pressed blanks are used than if materials in powder form are used.

In the apparatus according to the invention, a dosaging device which can be controlled in dependence on the abrasion of the pressed blanks or on the amount of hydrogen consumed, may advantageously further be provided for feeding the salt solution to the reaction vessel. Fresh salt solution is then fed to the reaction vessel, depending on the abrasion of the pressed blanks or the amount of hydrogen consumed. In this manner, uniform development of hydrogen is always ensured. The salt solution is, in addition, preferably conducted in a closed loop, a heat exchanger being arranged in the circuit. Through suitable arrangement of the inlet and outlet openings for the salt solution in the wall of the reaction vessel, turbulence of the liquid can be generated, which ensures uniform distribution of the metal powder abraded off the pressed blanks. This eliminates stirring devices which might otherwise be necessary. Through the circulation of the salt solution, the reaction mixture is furthermore kept in continuous motion to cause the powder grains to rub against each other, whereby interfering protective layers are removed. In this manner, the hydrogen yield is increased. The heat exchanger arranged in the loop for the salt solution removes the heat formed by the reaction.

In addition, a cooling flange can advantageously be arranged at the reaction vessel below the abrading device for the metal powder. Part of the water vapor formed is condensed thereby which covers the wall of the reaction vessel with a water film. In this manner, foaming of the reaction mixture can be reduced and the wall can be cleaned of adhering metal powder. In the lower part of the reaction vessel, a device controlled by a level indicator can advantageously be provided for removing the reaction sludge, e.g., a sludge pump which suctions off the reaction sludge. The level indicator responds if the reaction mixture has reached a given filling height. If necessary, the liquid contained in the reaction sludge can be separated by means of a separator.

The invention will be explained in further detail with reference to an example of the single drawing which shows apparatus for implementing the method according to the invention.

Referring to the drawing, magnesium or a magnesium/aluminum mixture is stored in the form of cylindrical pressed blanks 11. To generate hydrogen, the pressed blanks 11 are transported via a transporting arrangement 12, for instance, in the form of rolls or roller conveyors, into a lock 13. The lock 13 can be evacuated, so that, when the pressed blank is brought into the reaction vessel 10, no air is taken along by which the hydrogen could be contaminated. From the lock 13, the pressed blank 11 is brought, under exclusion of air, into a working container 14, which is connected with the reaction vessel 10. From the working container 14, the pressed blank 11 is moved by a feeding device 16, which may, for instance, be operated pneumatically, against a drill 17, which is arranged on the opposite side of the reaction vessel 10. The drill 17 is driven by a motor 18. The metal powder removed from the pressed blank 11 drops into the salt solution 19 contained in the reaction vessel 10. The powder reactions with the salt solution, forming hydrogen, which is led away from the reaction vessel 10 via the line 20. In line 20, a shutoff valve 15 is provided. The salt solution is pumped by a pump 21 in such a manner that a liquid vortex is produced in the reaction vessel 10, by which the powder is quickly intermixed with the salt solution. In addition to the pump 21, a heat exchanger 22 for removing the reaction heat is arranged in the loop 29. The reaction sludge accumulating at the bottom of the reaction vessel 10 can be removed by a pump 24. The pump 24 is controlled by a level indicator 23. It is advantageous to arrange in the line 30, for removing the reaction sludge, a separator 25, which dehydrates the reaction sludge. The hydrogen generating unit is controlled via the pressure in the reaction vessel 10, which is measured by a manometer 26. Via the manometer 26, the feed of the pressed blank is controlled and also the rate of forming metal powder from the pressed blank. To this end, the manometer 26 is functionally connected with the feeding device 16 and the motor 18. The addition of the salt solution to the reaction vessel 10 is controlled via a dosaging pump 27 in dependence on the consumed amount of metal. To this end, the dosaging pump 27 is functionally connected with the feeding device 16. A cooling flange 28, arranged at the reaction vessel 10, condenses part of the water vapor formed and covers the wall of the reaction vessel with a water film. It is advantageous to connect the heat exchanger 22 and the cooling flange 28 to a common feed and discharge lines for the cooling water.

In principle, the method according to the invention can also be applied to an acid or alkaline solution instead of a salt solution as the reaction solution for generating the hydrogen. With such reaction solutions, however, the reaction velocity is generally so high that the use of metals in powder form is not absolutely necessary. On the other hand, the use of acid or alkaline solutions is highly disadvantageous, particularly for the generation of hydrogen for fuel cells, because it involves higher costs for the hydrogen to be generated. In addition, the use of such reaction solutions is unfavorable from a process technology point of view.

What is claimed is:

1. A method for generating hydrogen by the reaction of a metal with an aqueous salt solution comprising:
   a. mechanically forming a powder from a pressed blank of the metal out of the presence of the aqueous salt solution;
   b. introducing said powder as it is formed into said aqueous salt solution.

2. The method of claim 1 wherein the rate of forming the powder from a pressed blank of the metal is controlled by the pressure of the generated hydrogen.

3. The method of claim 1 wherein said metal is magnesium or a mixture of magnesium and aluminum.

4. A method for generating hydrogen by the reaction of metals with an aqueous salt solution comprising:
   a. introducing a pressed metal blank over an aqueous salt solution;
   b. mechanically forming a powder from said metal blank;
   c. adding said powder as it is formed to said aqueous salt solution; and
   d. controlling at least one of steps (a) and (b) by the hydrogen pressure generated by the reaction.

5. A method for generating hydrogen by the reaction of a metal with an aqueous salt solution in a reaction vessel comprising:
   a. feeding a pressed metal blank to the reaction vessel over the aqueous salt solution;

b. mechanically forming metal powder from said blank whereby said metal powder drops into said salt solution as it is formed;

c. feeding additional aqueous salt solution to the reaction vessel for reaction with said metal powder as it is formed; and d. controlling the feed of said salt solution to said reaction vessel by the amount of metal powder formed from said blank.

6. A method for generating hydrogen by the reaction of a metal with an aqueous salt solution in a reaction vessel comprising:

a. feeding a pressed metal blank to the reaction vessel over the aqueous salt solution;

b. mechanically forming metal powder from said blank whereby said metal powder drops into said salt solution as it is formed;

c. feeding additional salt solution to the reaction vessel for reaction with said metal powder as it is formed;

d. inducing and maintaining continuous closed circulation of said aqueous salt solution into and out of said reaction vessel.

7. The method of claim 6 wherein said aqueous salt solution is passed through a heat exchanger before circulation into said reaction vessel.

* * * * *